US012645053B2

(12) United States Patent
Won et al.

(10) Patent No.: US 12,645,053 B2
(45) Date of Patent: Jun. 2, 2026

(54) LENS OPTICAL SYSTEM

(71) Applicant: HYUNDAI MOBIS CO., LTD., Seoul (KR)

(72) Inventors: Yong Hee Won, Yongin-si (KR); Jae Myung Ryu, Gumi-Si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 239 days.

(21) Appl. No.: 18/452,410

(22) Filed: Aug. 18, 2023

(65) Prior Publication Data

US 2024/0077700 A1 Mar. 7, 2024

(30) Foreign Application Priority Data

Sep. 2, 2022 (KR) ......................... 10-2022-0111647

(51) Int. Cl.
 *G02B 9/60* (2006.01)
 *G02B 13/18* (2006.01)
(52) U.S. Cl.
 CPC .............. *G02B 9/60* (2013.01); *G02B 13/18* (2013.01)
(58) Field of Classification Search
 None
 See application file for complete search history.

(56) References Cited

U.S. PATENT DOCUMENTS

| | | | | | |
|---|---|---|---|---|---|
| 2,638,034 | A | * | 5/1953 | Wreathall | .............. G02B 13/18 |
| | | | | | 359/708 |
| 4,368,957 | A | * | 1/1983 | Chirra | ...................... G02B 9/34 |
| | | | | | 359/766 |
| 4,523,817 | A | * | 6/1985 | Kikuchi | ................. G02B 13/24 |
| | | | | | 359/659 |
| 5,296,967 | A | * | 3/1994 | Moskovich | ............ G02B 13/24 |
| | | | | | 359/713 |
| 5,825,556 | A | * | 10/1998 | Meyers | .......... G02B 15/143105 |
| | | | | | 359/689 |
| 5,930,049 | A | * | 7/1999 | Suenaga | .............. G02B 13/143 |
| | | | | | 359/650 |
| 6,859,331 | B2 | * | 2/2005 | Kurata | ................... G02B 21/02 |
| | | | | | 359/656 |

FOREIGN PATENT DOCUMENTS

KR 101491283 B1 2/2015

* cited by examiner

*Primary Examiner* — Darryl J Collins
(74) *Attorney, Agent, or Firm* — Novo TechIP International PLLC

(57) ABSTRACT

The present invention relates to a lens optical system including a first lens, a second lens, a third lens, a fourth lens, and a fifth lens that are sequentially arranged from an object side to an image side, in which the first lens has positive refractive power and the second lens has negative refractive power.

13 Claims, 3 Drawing Sheets

10

LENS OPTICAL SYSTEM

CROSS-REFERENCE TO RELATED APPLICATIONS

This application claims priority under 35 U.S.C. § 119 to Korean Patent Application No. 10-2022-0111647, filed on Sep. 2, 2022, in the Korean Intellectual Property Office, the disclosure of which is incorporated herein by reference in its entirety.

TECHNICAL FIELD

The following disclosure relates to a lens optical system, and relates to a five-lens optical system capable of realizing maximum resolving power while having a high NA.

BACKGROUND

In general, various lighting devices are installed on front and rear of a vehicle to provide safety and driving convenience. In recent years, a light emitting diode (LED) is widely used as a light source for a vehicle lighting device. In the case of the lighting device using the LED as the light source, it is necessary to configure a lens capable of increasing a half-view angle and reducing manufacturing cost while more efficiently transmitting light from the light source.

Due to this need, research is being conducted to reduce the number of lenses used and increase a numerical aperture (NA), but when the number of lenses is reduced, it is difficult to maintain the resolution of the entire area of a beam pattern.

The background art of the present invention is disclosed in Korean Patent Publication No. 10-1491283 (Published on Feb. 6, 2015, Title of Invention: Head Lamp For Vehicle).

SUMMARY

The present invention has been devised as a result of research on "Development of HD Lighting Imaging Optical System", and an embodiment of the present invention is directed to providing a five-lens optical system capable of realizing maximum resolving power while having a high NA.

Another embodiment of the present invention is directed to providing efficient arrangement of refractive power of a lens in a lens optical system capable of realizing this and design conditions of the optical system.

In one general aspect, a lens optical system includes a first lens, a second lens, a third lens, a fourth lens, and a fifth lens that are sequentially arranged from an object side to an image side, in which NA may be 0.6 or more, the first lens may have positive refractive power, the second lens may have negative refractive power, the first lens may be a lens made of a plastic material, and the fifth lens may be a lens made of a glass material.

The lens optical system of the present invention may satisfy a Formula:

$$0.7 < \left| \frac{f_2}{f} \right| < 1 \qquad \text{<Formula>}$$

(Where $f_2$ denotes a focal length of the second lens, and f denotes a total combined focal length of the first to fifth lenses).

The lens optical system of the present invention may satisfy a Formula:

$$0.4 \leq \left| \frac{f_2}{f_{345}} \right| \leq 2 \qquad \text{<Formula>}$$

(Where $f_2$ denotes a focal length of the second lens, and $f_{345}$ denotes a total combined focal length of the third to fifth lenses).

The lens optical system of the present invention may satisfy a Formula:

$$\frac{d_2}{f_1} < 0.4 \qquad \text{<Formula>}$$

(Where $d_2$ denotes a distance between the first lens and the second lens, and $f_1$ is a focal length of the first lens).

The lens optical system of the present invention may satisfy a Formula:

$$0.2 \leq \frac{R_4}{f} \leq 0.6 \qquad \text{<Formula>}$$

(Where $R_4$ denotes a radius of curvature of the image side of the second lens, and f denotes a total combined focal length of the first to fifth lenses).

The lens optical system of the present invention may satisfy a Formula:

$$\left| \frac{f_{345}}{f_{12}} \right| \leq 0.7 \qquad \text{<Formula>}$$

(Where $f_{12}$ denotes a combined focal length of the first lens and the second lens, and $f_{345}$ denotes a combined focal length of all the third to fifth lenses).

The lens optical system of the present invention may satisfy a Formula:
<Formula>

$$0.5 \leq \frac{R_{10}}{R_9} \leq 0.7 \qquad \text{<Formula>}$$

(Where $R_9$ denotes a radius of curvature of the object side of the fifth lens, and $R_{10}$ denotes a radius of curvature of the image side of the fifth lens).

The lens optical system of the present invention may satisfy a Formula:

$$1.6 \leq n_{ave} \leq 1.8 \qquad \text{< Formula >}$$

(Where $n_{ave}$ denotes an average refractive index of the material of each of the first to fifth lenses).

The lens optical system of the present invention may satisfy a Formula:

$$1 \leq \frac{n_-}{n_+} \leq 1.2 \qquad \text{<Formula>}$$

3

(Where n_ denotes an average refractive index of materials of each of all the lenses having negative refractive power among all the first to fifth lenses, and n_+ denotes an average refractive index of materials of each of all the lenses having positive refractive power among the first to fifth lenses).

The second lens may have negative refractive power, and an Abbe number of the material of the second lens may be 30 or less.

The first lens and the second lens may be an aspherical lens, and any one of the third lens and the fourth lens may be an aspherical lens, and among the first to fifth lenses, a total of three or less aspherical lenses may be configured.

The third lens may be a biconvex lens, and the fourth lens may have a positive focal length.

The material of the fifth lens may have a refractive index of 1.85 or more and have an Abbe number of 30 or more.

The fifth lens may be a meniscus lens convex toward an object side and have negative refractive power.

Figure 1:
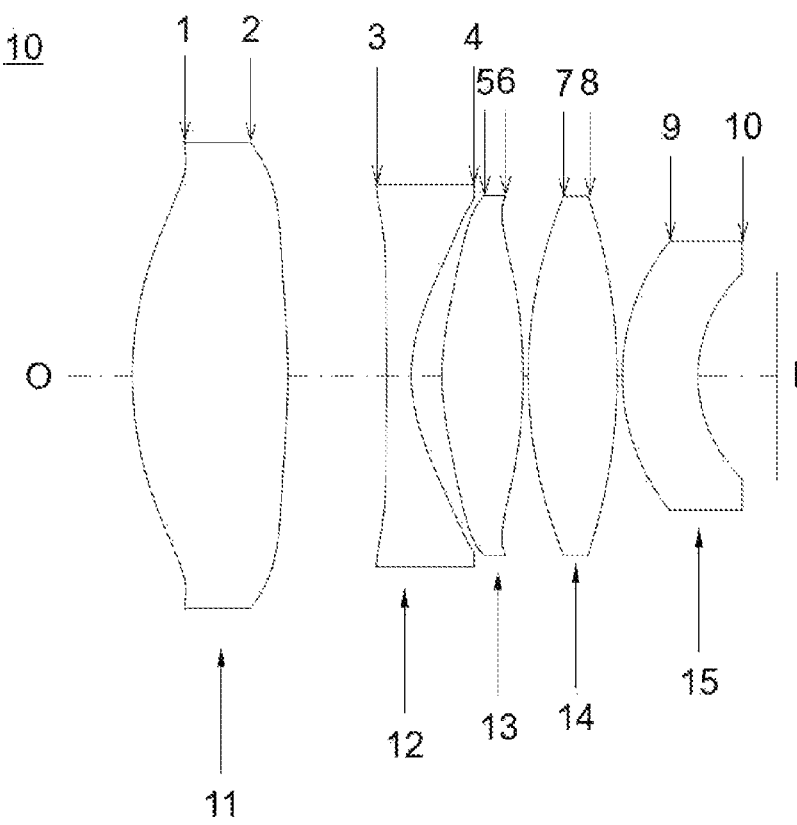
FIG. 1 is a diagram illustrating a lens optical system according to a first embodiment of the present invention.

The reference numerals and the elements they refer to are as follows:

10: Lens optical system
11: First lens
12: Second lens
13: Third lens
14: Fourth lens
15: Fifth lens
1: Object-side surface of first lens
2: Image-side surface of first lens
3: Object-side surface of second lens
4: Image-side surface of second lens
5: Object-side surface of third lens
6: Image-side surface of third lens
7: Object-side surface of fourth lens
8: Image-side surface of fourth lens
9: Object-side surface of fifth lens
10: Image-side surface of fifth lens
O: Object side
I: Image side

DETAILED DESCRIPTION

Hereinafter, the present invention will be described in detail with reference to the accompanying drawings.

Figure 2:
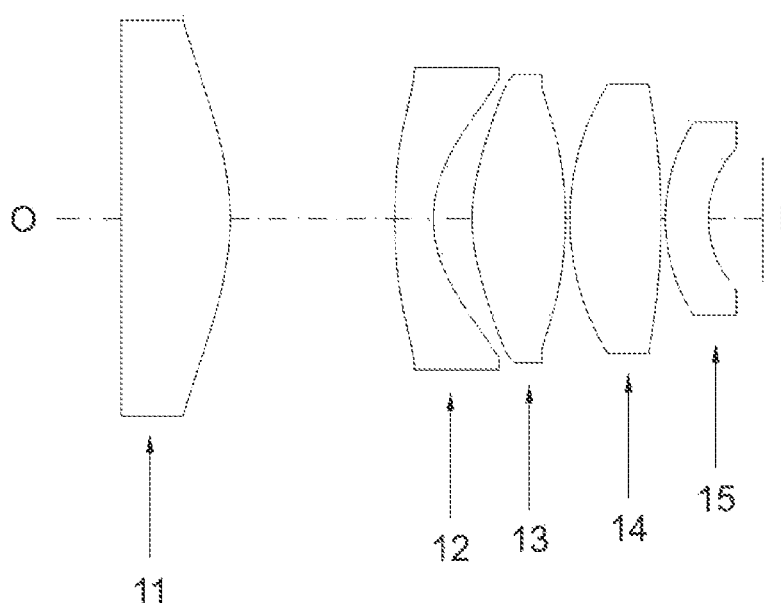
FIG. 2 is a diagram illustrating a lens optical system according to a second embodiment of the present invention.
Figure 3:
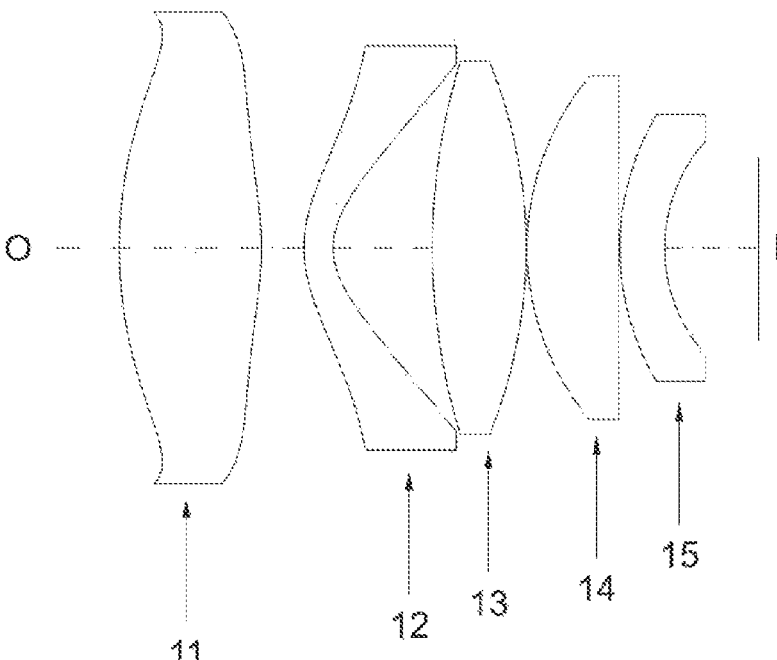
FIG. 3 is a diagram illustrating a lens optical system according to a third embodiment of the present invention.

FIG. 1 is a diagram illustrating a lens optical system according to a first embodiment of the present invention, FIG. 2 is a diagram illustrating a lens optical system according to a second embodiment of the present invention, and FIG. 3 is a diagram illustrating a lens optical system according to a third embodiment of the present invention. Each drawing corresponds to a diagram of a light path of an object at infinity with respect to an optical system.

There is provided a lens optical system including a first lens, a second lens, a third lens, a fourth lens, and a fifth lens that are sequentially arranged from an object side to an image side.

The lens optical system of the present invention has a high NA such as 0.6 or more.

The present invention is to provide an optical system having sufficient resolving power and low material cost while having a high NA. According to the present invention, to realize best resolving power at a half-view angle of 10° to 20°, in order from the front of the optical system, a first lens that has positive refractive power, a second lens that has negative refractive power, a third lens that has positive refractive power, a fourth lens that has positive refractive power, and a fifth lens that has negative refractive power are arranged in order. The half-view angle in an intelligent headlamp for a vehicle is about 10° to 25°, and basically, these optical systems are based on Cooke's triplet. The lens optical system of the present invention is designed by dividing a third lens into three pieces in the Cooke's triplet, and based on this, the second lens has negative refractive power.

At the same time, in order not to increase the material cost, the number of lenses of the lens optical system of the present invention is five or less. However, in order to satisfy these conditions, a diameter of the first lens increases. Accordingly, the present invention applies a plastic material to the first lens, and thus, even if an aspherical surface is applied, the material cost of the product may be reduced.

Furthermore, when the lens optical system of the present invention is applied to a headlamp for a vehicle in which a light source is assembled on the image side, it is preferable to apply a glass material to a lens close to the light source so that the lens is not deformed by the high heat of the light source. Based on this, a lens made of glass is applied as the fifth lens.

Meanwhile, the resolving power performance required by the product may be satisfied only when the refractive power of the first lens and the second lens are properly designed. In order to satisfy this, the lens optical system of the present invention satisfies Formulas 1 and 2 below.

$$0.7 < \left| \frac{f_2}{f} \right| < 1 \qquad \text{<Formula 1>}$$

Here, $f_2$ denotes a focal length of the second lens, and $f$ denotes a total combined focal length of the first to fifth lenses.

$$0.4 \le \left| \frac{f_2}{f_{345}} \right| \le 2 \qquad \text{<Formula 2>}$$

Here, $f_2$ denotes a focal length of the second lens, and $f_{345}$ denotes a total combined focal length of the third to fifth lenses.

Formulas 1 and 2 are conditions for realizing high resolving power by minimizing aberration. A lower limit of Formula 1 is a condition in which the focal length of the second lens is too short and the aberration increases rapidly, an upper limit of Formula 1 is a condition in which the focal length of the second lens is too long and aberration correction is not sufficient, and Formula 2 also has a similar meaning to Formula 1. Based on this, the lens optical system of the present invention can satisfy Formulas 1 and 2.

In this case, the refractive power of the optical system, specifically, the refractive power of two lens groups in front of the optical system, that is, a first lens and a second lens, and three lens groups behind the optical system, that is, third to fifth lenses, needs to be properly disposed. As a condition for this, the lens optical system of the present invention satisfies Formula 5 below.

$$\left| \frac{f_{345}}{f_{12}} \right| \leq 0.7 \qquad \text{<Formula 5>}$$

Here, $f_{12}$ denotes a combined focal length of the first lens and the second lens, and $f_{345}$ denotes a total combined focal length of the third to fifth lenses.

Such an appropriate refractive power arrangement has an advantage in correcting chromatic aberration. In the two lens groups, that is, the front two lens groups and the rear three lens groups, a lens having positive refractive power and a lens having negative refractive power, respectively, are used. As in the embodiment, crown-type materials and flint-type materials are simultaneously used for the lenses to correct chromatic aberration in each lens group. The upper limit of Formula 5 means that higher refractive power is disposed in the rear three lens groups. As in the embodiment, since the sign of the combined focal length of the front two lens groups changes, the lower limit in Formula 5 becomes 0. As the refractive power of each lens is generally arranged in this way, the refractive power arrangement of the second lens becomes relatively important. Based on this, the lens optical system of the present invention may satisfy Formula 5, and Formula 2 described above may correspond to the condition supplementing this.

Furthermore, since the negative refractive power of the second lens is determined as the corresponding refractive power on the image-side surface, the lens optical system of the present invention satisfies Formula 4 below as a condition for this.

$$0.2 \leq \frac{R_4}{f} \leq 0.6 \qquad \text{<Formula 4>}$$

Here, $R_4$ denotes the radius of curvature of the image side of the second lens (i.e., the radius of curvature of the image-side surface), and f denotes the total combined focal length of the first to fifth lenses.

The lower limit of Formula 4 corresponds to the condition that the radius of curvature of the image-side surface of the second lens is too small, and thus, the aberration greatly increases, and the incident angle of light rays increases at the periphery of the lens, and thus the reflectance also increases and the efficiency of the optical system decreases. In the opposite case, the refractive angle of the lens becomes small, so a total length of the optical system becomes long, and the aberration correction becomes insufficient. Based on this, the lens optical system of the present invention may satisfy Formula 4 below.

As an additional condition, the lens optical system of the present invention satisfies Formula 3 below.

$$\frac{d_2}{f_1} < 0.4 \qquad \text{<Formula 3>}$$

Where $d_2$ denotes a distance between the first lens and the second lens, and $f_1$ is a focal length of the first lens.

This condition is a condition for the total length of the optical system. Since the distance between each lens must be greater than 0, the lower limit of Formula 3 does not need to be set separately, but when the distance is greater than the upper limit of Formula 3, the total length of the optical system becomes excessively large. Based on this, the lens optical system of the present invention may satisfy Formula 3 below.

As an additional condition, the lens optical system of the present invention satisfies Formula 6 below.

$$0.5 \leq \frac{R_{10}}{R_9} \leq 0.7 \qquad \text{<Formula 6>}$$

Here, $R_9$ denotes the radius of curvature (i.e., radius of curvature of the object-side surface) of the object side of the fifth lens, and $R_{10}$ denotes the radius of curvature (i.e., radius of curvature of the image-side surface) of the image side of the fifth lens.

This condition is a condition for satisfying an aplanatic condition (condition for simultaneous correction of spherical aberration and coma aberration) in a last lens of the optical system, that is, the fifth lens, and having a meniscus shape so that a role of a field flattener is performed. When the radius of curvature reaches the lower limit of Formula 6, the curvature of the image-side surface of the fifth lens increases, making it difficult to satisfy the aplanatic condition. In the opposite case, the sign of the refractive power of the fifth lens changes, making it impossible to satisfy the overall refractive power arrangement condition. Based on this, the lens optical system of the present invention may satisfy Formula 6 below.

As an additional condition, the lens optical system of the present invention satisfies Formulas 7 and 8 below.

$$1.6 \leq n_{ave} \leq 1.8 \qquad \text{< Formula 7 >}$$

Here, $n_{ave}$ denotes an average refractive index of the material of each of the first to fifth lenses)

$$1 \leq \frac{n_-}{n_+} \leq 1.2 \qquad \text{<Formula 8>}$$

Here, $n_-$ denotes an average refractive index of materials of each of all the lenses having negative refractive power among all the first to fifth lenses, and $n_+$ denotes an average refractive index of materials of each of the lenses having positive refractive power among the first to fifth lenses.

The higher the refractive index of the material, the more advantageous it is for aberration correction, but since the aspherical surface to which the material with the high refractive index is applied is expensive, a plastic material is used for the aspherical lens. Formula 7 is a refractive index condition of the material of the optical system. It is difficult to correct the aberration at the lower limit of Formula 7, and the upper limit corresponds to the limit value due to the use of a plastic material. Formula 8 is also a refractive index condition of the material of the optical system. The lower limit of Formula 8 means that a high refractive material is used for a lens material having a positive refractive index rather than a lens having a negative refractive power. This means that a plastic material with a relatively low refractive index is used for a lens having negative refractive power. Based on this, the lens optical system of the present invention may satisfy Formulas 7 and 8 below.

As the more aspherical surfaces are applied to the optical system, the manufacturing cost increases. In the opposite case, the aberration is not corrected, and thus, the resolving power performance may not be satisfied. Therefore, it is preferable that only about three aspherical lenses be used in an optical system with a high NA formed of 5 sheets like this lens optical system. Based on this, in the lens optical system of the present invention, the first lens and the second lens may be manufactured as an aspherical lens, and any one of the third lens and the fourth lens may be manufactured as an aspherical lens.

In this case, a crown-type material having an Abbe number of 50 or more is used for lenses having positive refractive power, for example, the first, third, and fourth lenses, and a flint-type material with an Abbe number of 30 or less is used for lenses having negative refractive power, for example, the second and fifth lenses. In addition, despite the high NA, a high refractive index material with a refractive index of 1.85 or more are applied to the fifth lens to correct the astigmatism and a curvature of field, and to correct the spherical aberration and coma at the same time, as described above, the fifth lens is configured to be a meniscus lens convex toward the object side. The aspherical formula used in the present invention is as follows.

$$z = \frac{c \cdot x}{1 + \sqrt{1 - c^2(1 + k)x^2}} + Ax^4 + \cdots \qquad \text{<Formula>}$$

Here, z means the distance from the apex of the lens in the direction of the optical axis, x means the distance in the direction perpendicular to the optical axis, c means a reciprocal (1/r) of the radius of curvature at the apex of the lens, k means a conic constant, and A means an aspherical coefficient.

Hereinafter, specific data of the lens optical systems of the first to third embodiments will be described.

TABLE 1

| Lens optical system data of first example (f = 29.556 mm, NA = 0.7) | | | | | | |
|---|---|---|---|---|---|---|
| S# | Radius | Thick | H-Aper | EFL (d-line) | nd | vd |
| 1 (Object-side surface of first lens) | 33.732 | 14.48 | 21.01 | 43.676 | 1.535 | 55.73 |
| 2 (Image-side surface of first lens) | −64.669 | 9.2 | 21.67 | | | |
| 3 (Object-side surface of second lens) | −327.459 | 2.301 | 17.82 | −22.005 | 1.6355 | 23.89 |
| 4 (Image-side surface of second lens) | 14.648 | 2.852 | 16.49 | | | |
| 5 (Object-side surface of third lens) | 23.673 | 7.546 | 16.76 | 31.069 | 1.535 | 55.73 |
| 6 (Image-side surface of third lens) | −49.603 | 0.5 | 16.45 | | | |
| 7 (Object-side surface of fourth lens) | 43.984 | 8.271 | 16.71 | 34.136 | 1.72916 | 54.67 |
| 8 (Image-side surface of fourth lens) | −52.793 | 0.5 | 16.4 | | | |
| 9 (Object-side surface of fifth lens) | 20.072 | 7.032 | 12.52 | −75.973 | 2.00069 | 25.46 |
| 10 (Image-side surface of fifth lens) | 13.097 | 7.351 | 9.54 | | | |
| image | infinity | 0 | | | | |

TABLE 2

| Lens optical system data of first example (Aspherical coefficients) | | |
|---|---|---|
| | K | A |
| 1 (Object-side surface of first lens) | −12.72355 | 4.9E−05 |
| 2 (Image-side surface of first lens) | −80 | 1.3E−05 |
| 3 (Object-side surface of second lens) | 63.76535 | 4.8E−05 |
| 4 (Image-side surface of second lens) | −0.47351 | −1E−04 |
| 5 (Object-side surface of third lens) | −2.69379 | −7E−05 |
| 6 (Image-side surface of third lens) | −80 | −6E−05 |

TABLE 3

| Lens optical system data of second example (f = 30.467mm, NA = 0.7) | | | | | | |
|---|---|---|---|---|---|---|
| S # | Radius | Thick | H-Aper | EFL (d-line) | nd | vd |
| 1 (Object-side surface of first lens) | infinity | 12.6 | 22.5 | 54.665 | 1.53545 | 55.71 |
| 2 (Image-side surface of first lens) | −29.27 | 19 | 22.32 | | | |
| 3 (Object-side surface of second lens) | 88.797 | 4.4 | 17.07 | −24.16 | 1.6355 | 23.89 |
| 4 (Image-side surface of second lens) | 12.838 | 4.508 | 15.9 | | | |
| 5 (Object-side surface of third lens) | 19.974 | 10.783 | 16.57 | 26.732 | 1.53545 | 55.71 |
| 6 (Image-side surface of third lens) | −41.004 | 0.5 | 15.98 | | | |
| 7 (Object-side surface of fourth lens) | 28.923 | 10.52 | 15.55 | 30.399 | 1.72916 | 54.68 |
| 8 (Image-side surface of fourth lens) | −80.328 | 0.5 | 14.21 | | | |
| 9 (Object-side surface of fifth lens) | 20.227 | 4.967 | 11 | −38.294 | 2.00069 | 25.43 |
| 10 (Image-side surface of fifth lens) | 11.613 | 6.287 | 8.01 | | | |
| image | infinity | 0 | | | | |

TABLE 4

| Lens optical system data of second example (Aspherical coefficients) | | |
|---|---|---|
| | K | A |
| 2 (Image-side surface of first lens) | −16.1 | −6.40E−05 |
| 3 (Object-side surface of second lens) | −67.3 | 8.03E−05 |
| 4 (Image-side surface of second lens) | −0.5 | −4.84E−05 |
| 5 (Object-side surface of third lens) | −2.3 | −5.25E−05 |
| 6 (Image-side surface of third lens) | −39.4 | −6.76E−05 |

TABLE 5

| Lens optical system data of third example (f = 30.498 mm, NA = 0.7) | | | | | | |
|---|---|---|---|---|---|---|
| S# | Radius | Thick | H-Aper | EFL (d-line) | nd | vd |
| 1 (Object-side surface of first lens) | 45.67 | 13.5 | 23 | 36.171 | 1.535 | 55.73 |
| 2 (Image-side surface of first lens) | −30.336 | 4.033 | 22.6 | | | |
| 3 (Object-side surface of second lens) | 12.627 | 2.8 | 19.69 | −27.04 | 1.6355 | 23.89 |
| 4 (Image-side surface of second lens) | 6.675 | 9.426 | 17.94 | | | |
| 5 (Object-side surface of third lens) | 62.775 | 8.92 | 18 | 38.965 | 1.72916 | 54.67 |
| 6 (Image-side surface of third lens) | −49.174 | 0.1 | 18.19 | | | |
| 7 (Object-side surface of fourth lens) | 26.517 | 8.71 | 16.76 | 36.457 | 1.72916 | 54.67 |
| 8 (Image-side surface of fourth lens) | 3347.767 | 0.1 | 15.72 | | | |
| 9 (Object-side surface of fifth lens) | 25.8 | 4.29 | 13 | −55.598 | 1.94595 | 17.98 |
| 10 (Image-side surface of fifth lens) | 15.968 | 8.899 | 10.46 | | | |
| image | infinity | 0 | | | | |

TABLE 6

| Lens optical system data of third example (Aspherical coefficients) | | |
|---|---|---|
| | K | A |
| 1 (Object-side surface of first lens) | −0.1 | 2.00E−06 |
| 2 (Image-side surface of first lens) | −23.6 | 2.75E−05 |
| 3 (Object-side surface of second lens) | −2.4 | −6.58E−05 |
| 4 (Image-side surface of second lens) | −1.8 | −4.84E−05 |

TABLE 7

| Result data after calculating Formulas | | | |
|---|---|---|---|
| | Example 1 | Example 2 | Example 3 |
| NA | 0.7 | 0.7 | 0.7 |
| f | 29.556 | 30.467 | 30.524 |
| HFOV | 18.5 | 13 | 17 |
| $f_1$ | 43.676 | 54.665 | 36.171 |
| $f_2$ | −22.005 | −24.16 | −27.04 |
| $f_{12}$ | 75.517 | −157.006 | 312.715 |
| $f_{345}$ | 40.869 | 15.605 | 21.793 |
| $d_2$ | 9.2 | 19 | 4.033 |
| $R_4$ | 14.648 | 12.838 | 6.675 |
| $R_9$ | 20.072 | 20.227 | 25.8 |
| $R_{10}$ | 13.097 | 11.613 | 15.968 |
| $D_{ave}$ | 1.68707 | 1.68725 | 1.71495 |
| $n_-$ | 1.81810 | 1.81810 | 1.79073 |
| $n_+$ | 1.59972 | 1.60002 | 1.66444 |
| eq (1) | 0.745 | 0.793 | 0.886 |
| eq (2) | 0.538 | 1.548 | 1.241 |
| eq (3) | 0.211 | 0.348 | 0.111 |
| eq (4) | 0.496 | 0.421 | 0.219 |
| eq (5) | 0.541 | 0.099 | 0.0697 |
| eq (6) | 0.653 | 0.574 | 0.619 |
| eq (7) | 1.687 | 1.687 | 1.715 |
| eq (8) | 1.137 | 1.136 | 1.076 |

As described above, according to the present invention, by efficiently arranging refractive power of five lenses, it is possible to implement an optical system capable of realizing maximum resolving power and using a small number of lenses while having a high NA.

Although exemplary embodiments of the present invention has been described with reference to the accompanying drawings, those skilled in the art will appreciate that various modifications and alterations may be made without departing from the spirit or essential feature of the present invention. Therefore, it should be understood that the above-mentioned embodiments are exemplary in all aspects but are not limited thereto.

What is claimed is:

1. A lens optical system comprising:
a first lens, a second lens, a third lens, a fourth lens, and a fifth lens sequentially arranged from an object side to an image side,
wherein:
numerical aperture (NA) is 0.6 or more,
the first lens has positive refractive power,
the second lens has negative refractive power,
the first lens is a lens made of a plastic material, and
the fifth lens is a lens made of a glass material,
wherein the following formula $$0.7 < \left| \frac{f_2}{f} \right| < 1$$

is satisfied, where $f_2$ denotes a focal length of the second lens, and f denotes a total combined focal length of the first lens, the second lens, the third lens, the fourth lens, and the fifth lens.

2. The lens optical system of claim 1, wherein the following formula $$0.4 \leq \left| \frac{f_2}{f_{345}} \right| \leq 2$$

is satisfied, where $f_2$ denotes a focal length of the second lens, and $f_{345}$ denotes a total combined focal length of the third lens, the fourth lens, and the fifth lens.

3. The lens optical system of claim 1, wherein the following formula $$\frac{d_2}{f_1} < 0.4$$

is satisfied, where $d_2$ denotes a distance between the first lens and the second lens, and $f_1$ is a focal length of the first lens.

4. The lens optical system of claim 1, wherein the following formula is satisfied, where f12 denotes a combined focal length of the first lens and the second lens, and f345 denotes a total combined focal length of the third lens, the fourth lens, and the fifth lens.

5. The lens optical system of claim 1, wherein the formula $$1.6 \le n_{ave} \le 1.8$$

is satisfied, where $n_{ave}$ denotes an average refractive index of each of the first lens, the second lens, the third lens, the fourth lens, and the fifth lens.

6. The lens optical system of claim 1, wherein the following formula $$1 \le \frac{n_-}{n_+} \le 1.2$$

is satisfied, where $n_-$ denotes an average refractive index of materials of lenses having negative refractive power among the lens, the second lens, the third lens, the fourth lens, and the fifth lens, and $n_+$ denotes an average refractive index of materials of lenses having positive refractive power among the first lens, the second lens, the third lens, the fourth lens, and the fifth lens.

7. The lens optical system of claim 1, wherein:
the second lens has negative refractive power, and
an Abbe number of a material of the second lens is 30 or less.

8. The lens optical system of claim 1, wherein:
the first lens and the second lens are each an aspherical lens, and either one of the third lens and the fourth lens is an aspherical lens, and
among the first lens, the second lens, the third lens, the fourth lens, and the fifth lens, a total of three or fewer are configured as aspherical lenses.

9. The lens optical system of claim 1, wherein the third lens is a biconvex lens, and the fourth lens has a positive focal length.

10. The lens optical system of claim 1, wherein the glass material of the fifth lens has a refractive index of 1.85 or more, and has an Abbe number of 30 or more.

11. The lens optical system of claim 1, wherein the fifth lens is a meniscus lens convex toward an object side and has negative refractive power.

12. A lens optical system comprising:
a first lens, a second lens, a third lens, a fourth lens, and a fifth lens sequentially arranged from an object side to an image side,
wherein:
numerical aperture (NA) is 0.6 or more,
the first lens has positive refractive power,
the second lens has negative refractive power,
the first lens is a lens made of a plastic material, and
the fifth lens is a lens made of a glass material,
wherein the following formula $$0.2 \le \frac{R_4}{f} \le 0.6$$

is satisfied, where $R_4$ denotes a radius of curvature of an image side of the second lens, and f denotes a total combined focal length of the first lens, the second lens, the third lens, the fourth lens, and the fifth lens.

13. A lens optical system comprising:
a first lens, a second lens, a third lens, a fourth lens, and a fifth lens sequentially arranged from an object side to an image side,
wherein:
numerical aperture (NA) is 0.6 or more,
the first lens has positive refractive power,
the second lens has negative refractive power,
the first lens is a lens made of a plastic material, and
the fifth lens is a lens made of a glass material,
wherein the formula $$0.5 \le \frac{R_{10}}{R_9} \le 0.7$$

is satisfied, where $R_9$ denotes a radius of curvature of the object side of the fifth lens, and $R_{10}$ denotes a radius of curvature of an image side of the fifth lens.

* * * * *